Oct. 25, 1966 E. C. COCHET 3,280,635
AUTOMATIC SAMPLER WITH SCOOPING-WHEEL
Filed June 24, 1964 6 Sheets-Sheet 3

Oct. 25, 1966    E. C. COCHET    3,280,635
AUTOMATIC SAMPLER WITH SCOOPING-WHEEL

Filed June 24, 1964    6 Sheets-Sheet 5

Oct. 25, 1966   E. C. COCHET   3,280,635
AUTOMATIC SAMPLER WITH SCOOPING-WHEEL

Filed June 24, 1964   6 Sheets-Sheet 6

United States Patent Office 3,280,635
Patented Oct. 25, 1966

3,280,635
AUTOMATIC SAMPLER WITH SCOOPING-WHEEL
Ernest Constant Cochet, Petite-Rosselle, France, assignor to Houilleres du Bassin de Lorraine Faulquemont, Moselle, France
Filed June 24, 1964, Ser. No. 377,742
Claims priority, application France, July 12, 1963, 941,243, Patent 1,370,721
12 Claims. (Cl. 73—424)

This invention relates to automatic sampling devices in installations for mechanically preparing coal or ore, the sampling is carried out chiefly in order to control the quality of the products obtained for subsequent commercial use, and also for controlling production in order to permit automatic regulation of the preparation apparatus.

Heretofore most of the sampling operations have been performed manually, but this method has the basic disadvantages of requiring extra manpower, and in many cases of hampering operation and reducing output due to the stoppages of the belt conveyor required to permit sampling. Such manual sampling operations also have the disadvantage of introducing errors due to the human factor, and most importantly are incompatible with a fully automatic installation.

Attempts have therefore been made to devise apparatus which would effect the samplings automatically and above all be capable:

(a) Of providing as representative as possible a sample of the product to be sampled;
(b) Of permitting sampling while the plant is operating;
(c) Of permitting recovery and transport of the sample;
(d) Of causing no breakages, glancing off, spilling over, or modification of the physical properties of the products to be sampled;
(e) Of being readily installed in a minimum of space;
(f) Of being remote-controlled manually, or automatically by a timer;
(g) Of allowing samples of different sizes to be taken; and
(h) Of being as inexpensive as possible.

A number of arrangements and apparatus which will satisfy the above-cited requirements in varying degrees are presently available.

In one known system, sampling from a chute is effected via a trap-door fitted within the chute. This trap-door is operated periodically by a compressed air actuator controlled by a timer.

This system, though extremely simple, has the following drawbacks:

(a) It can be installed only between two production or transport machines, which in turn presupposes that sufficient height is available.
(b) Due to the inertia of the system, the quantity of product sampled each time is considerable once the throughput is large.
(c) Sealing problems are not easy to solve, and the pivotal motion of the trap-door may cause crowding.

In a second known system, a barrel-type chute is a variant in the system referred to precedingly. Rotation of the barrel enables the product flowing through the chute to be momentarily directed toward a suitable receptacle. This system, however, has the same disadvantages as the one just referred to.

In another known sampler, an arm pivots about a vertical axis through a stream of the product to be sampled. The movements of this arm are pneumatically controlled and its speed and sampling frequency are adjusted by timers. Within each arm a small conveyor belt driven by an electric motor evacuates the product collected by the arm.

This apparatus, however, is rather fragile and can be installed only in a free stream of product and is suitable mainly for small grain sizes (0 to 10 mm.). With larger grain sizes, the shocks on the arm become greater, so that the product bounces off and the sample is no longer representative; moreover, there is the danger that the arm may sustain damage in such cases.

A further known device is the "money-box" sampler described in an article in the June 1961 issue of the German periodical "Mitteilungen von VGB," entitled "Automatic Coal Sampling and Sorting." This sampler consists of a car supporting a slotted container having slots positioned in the direction of flow of the coal. The car moves through a jet of the freely falling product, for instance at a transfer station where the product is discharged from a belt conveyor. The slot must be of a width such that even the largest pieces can pass through it freely without interfering with the flow.

Such an apparatus is limited to products whose grain size does not exceed 35 mm. Furthermore, it is bulky and requires that a certain number of troublesome precautions be taken, such as the installation of rails and means for opening the trap-door of the slotted container when the same reaches the end of its travel. Lastly, the weight of the sample taken at the end of a sampling run will be a function of the belt conveyor throughput and may be very high if the throughput is large.

Another device is the scraper-type Pollock sampler described in the February 1963 issue of "Colliery Engineering" under the title "Automatic Sampling of Coal" and is intended to be installed on a belt conveyor. It consists of a scraper arm which scrapes off the product over a certain width of the belt, the scraping taking place across the direction of travel of the belt. This system has the following drawbacks:

(a) The products may become jammed between the scraper and the belt.
(b) In the course of its movement, the scraper acts as an obstacle to the forward progress of the product on the belt. This drawback restricts the use of this system, which cannot be installed in the case of high-speed conveyors with large throughputs. It is also detrimental to the representativeness of the sample.

It is an object of the present invention to overcome these various drawbacks by providing an automatic scooping-wheel type sampler which comprises a supporting structure which straddles the main conveyor belt for the material to be sampled and supports a scooping-wheel driven by an independent motor and which consists of two spaced circular sectional irons resting on flanged rail-wheels mounted on adjustable bearings and between which sectional irons, on the one hand, is fixed a scoop for sampling material from the main travelling conveyor belt and, on the other hand, is disposed a small scoop-emptying hopper which feeds a discharge belt passing through said scooping-wheel, said scooping-wheel being caused to effect a complete revolution at each cycle through the agency of an adjustable timer or through the closure of contacts in an overall servo-control circuit, whereby the samplings are effected either at regular intervals or at a clearly specified instant in the midst of a more complex sequence of operations, said scoop and said hopper being made of a material permitting complete emptying thereof.

The apparatus hereinbefore specified ensures that the samples taken are as representative as possible of the product carried along by the main conveyor belt, without involving any breakages, glancing off, spilling over, or modification of the physical properties of the products to be sampled, while permitting ready recovery and transport of the sample. Moreover, the samples taken do not increase in size as a function of the throughput of the material. Lastly, the sampling scoop is in no danger of causing the material to become jammed between the scoop and the main conveyor belt, or of constituting an obstacle to the forward progress of the material on the belt.

Preferably, the flanged railwheels are mounted in pairs at the corners of a triangle, thereby permitting easy compensation for wear. The sampling scoop and the emptying hopper are preferably made or lined with stainless steel or any other material for preventing fine particles from accumulating on their walls. The apparatus comprises a plurality of interchangeable scoops readily adaptable to the wheel, the circular sectional irons of which are accordingly joined together by means of adjustable spacing struts.

In a first preferred form of embodiment, the scooping wheel is fixedly mounted on the supporting structure and a scoop dredges a sample from the trough formed by the main belt and follows a path parallel with the longitudinal axis of said belt, whereby a groove is formed thereon.

The rotation speed of the scooping-wheel will in this case be determined in such manner, that the difference between the tangential velocity of the scoop and the speed of the main conveyor belt be as small as possible in order to avoid any spillage or interference with the flow.

In a second preferred form of embodiment, the scooping-wheel is supported by a crab which travels along tracks parallel with the structure of the main conveyor belt, and said wheel rotates in a plane perpendicular to the longitudinal belt axis, whereby the scoop dredges the sample perpendicularly thereto and samples the product off the full width of the belt. The diameter of the scooping-wheel and the shape of the scoop are chosen so that they match the profile of said main conveyor belt.

In the latter-mentioned second form of embodiment, the crab moves in the same direction and at the same speed as the main conveyor belt during the sampling period.

The description which follows with reference to the accompanying non-limitative exemplary drawings will give a clear understanding of how the invention can be carried into practice and will disclose still further features thereof:

Figure 1:
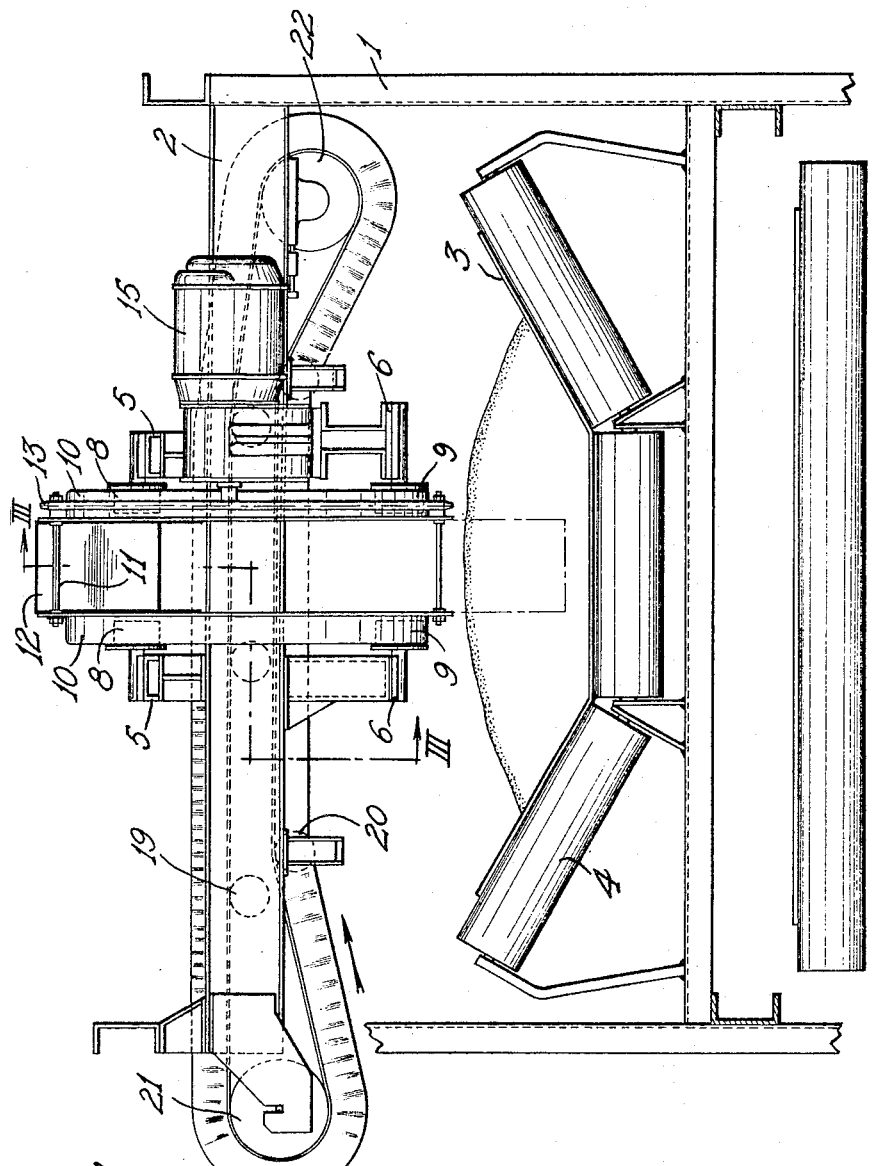
FIG. 1 is an elevation view, perpendicular to the sampling direction, of a first constructional form of a scooping-wheel type sampler according to this invention.
Figure 2:
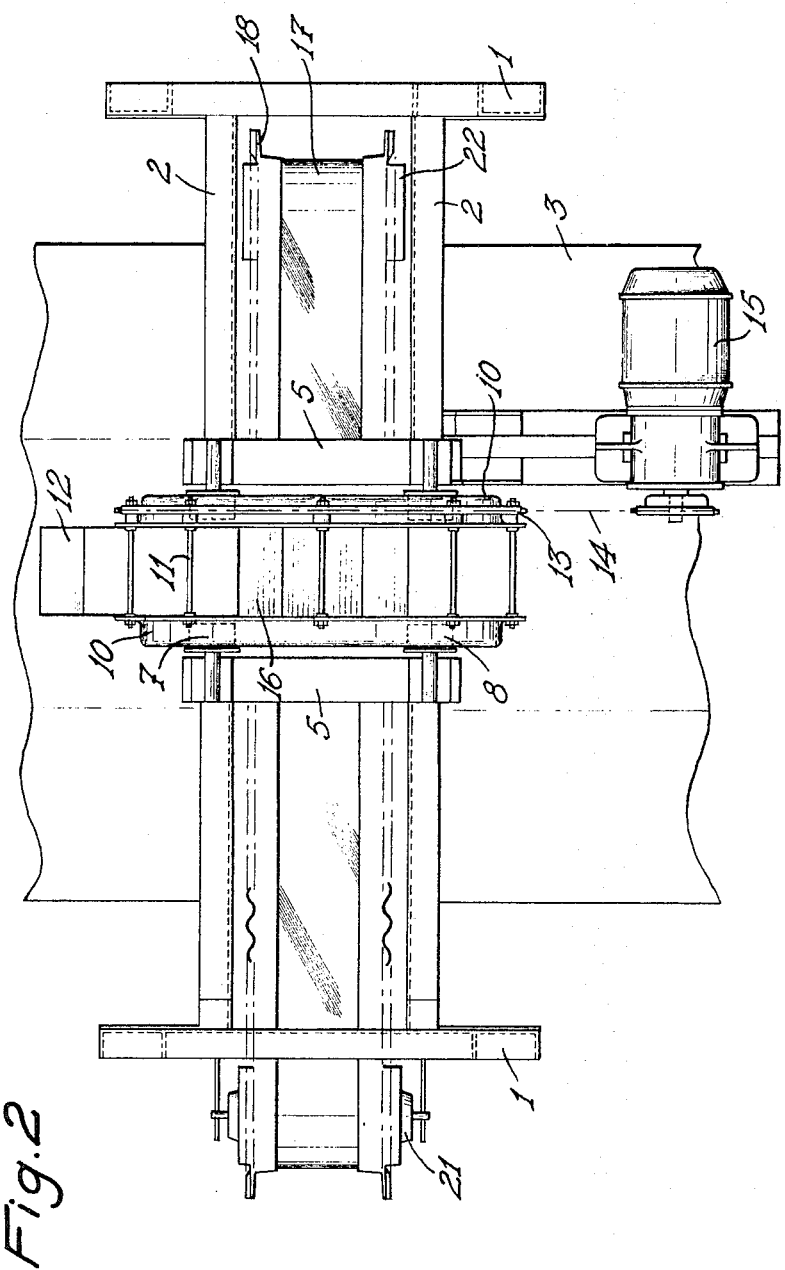
FIG. 2 is a plan view of the sampler of FIG. 1.
Figure 3:
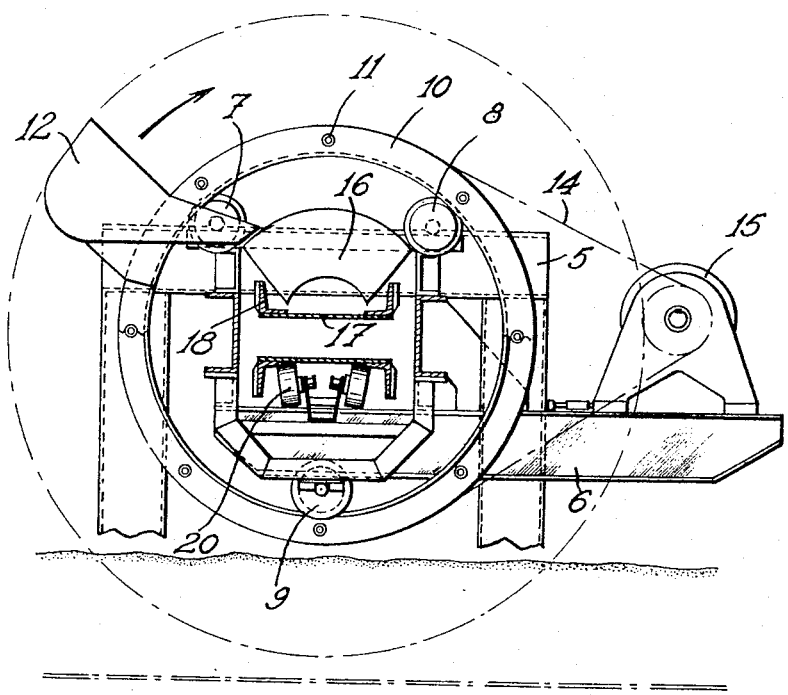
FIG. 3 is a section taken through the line III—III of FIG. 1.

Referring first to the constructional form illustrated in FIGS. 1 to 3, therein is shown a supporting structure consisting of uprights 1 and cross-members 2 placed astride a main coal conveyor comprising a conveyor belt 3 which is supported by rolls 4 to form a trough shape. Parallel with the longitudinal axis of said conveyor, on the cross-members 2, is mounted a stand constructed from shaped section members comprising two mutually spaced upper cross-members 5 and lower cross-members 6 on which are mounted, at the corners of a triangle, three pairs of aligned railwheels 7, 8 and 9, respectively. These flanged railwheels support a scooping-wheel consisting of two circular section members 10 which are interconnected through adjustable spacing struts 11 and which support a sampling scoop 12. One of said circular section members 10 has sprocket teeth 13 formed thereon whereby to enable the wheel to be driven through a chain 14 by an independent motor 15 mounted on the stand.

Within the scooping wheel is disposed a small hopper 16 into which the material collected by the scoop 12 is spilled. The sample taken by the scoop 12 and received by the hopper 16 is discharged by the latter onto a discharge belt 17 having lateral flanges 18 and which is supported by upper rollers 19 and lower rollers 20. This discharge belt traverses the scooping-wheel through the gap bounded by the flanged railwheels 7 through 9 and is driven by a power drum 21 at one end and runs over an idler drum 22 at the other end. The material spilled onto the discharge belt falls into a chute or into a container (not shown) on the left of FIG. 1, beyond the supporting structure and hence outside the compass or bounds of the main conveyor.

Figure 7:
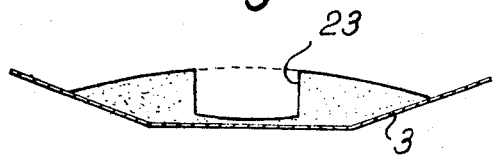
FIGS. 7 and 8 illustrate the traces left respectively at right angles to and parallel with the longitudinal axis of the belt conveyor by the sampling scoop of the sampler of FIGS. 1 to 3.
Figure 8:
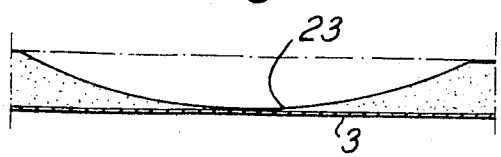
Figure 9:
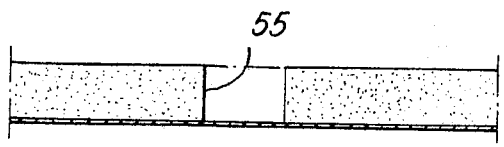
FIG. 9 shows the trace left by a conventional manual sampling operation.

In the arrangement shown in FIGS. 1 to 3, the scoop 12 fixed to the scooping-wheel dredges the sample from the trough formed by the conveyor belt 3, along a path parallel with the longitudinal axis of said belt. Thus it traces a lengthwise groove along the main belt, shown by reference numeral 23 in FIGS. 7 and 8. The scoop 12 is so devised that this groove 23 fails to reach the belt 3, thus avoiding the drawbacks of the scraper type samplers and also ensuring that the main belt 3 is kept moving. The rotation speed of the scooping-wheel is calculated so that the difference between the tangential velocity of the scoop 12 and the speed of the main belt 3 is as small as possible, thus avoiding any spillage or interference with the flow of the coal. The discharge belt 17 conveys the sample beyond the compass of the main conveyor belt 3.

Figure 4:
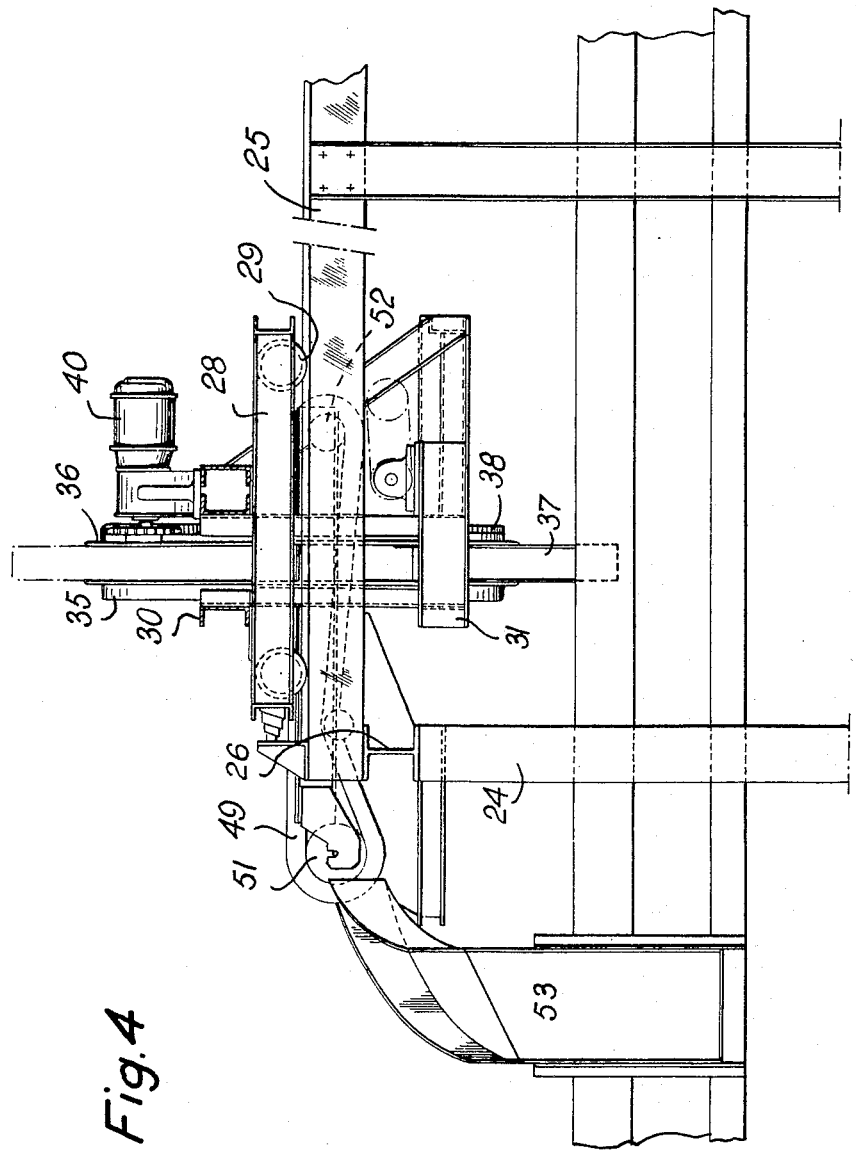
FIG. 4 is an elevation view, perpendicularly to the sampling direction, of a second constructional form of an automatic scooping-wheel type sampler according to this invention.
Figure 5:
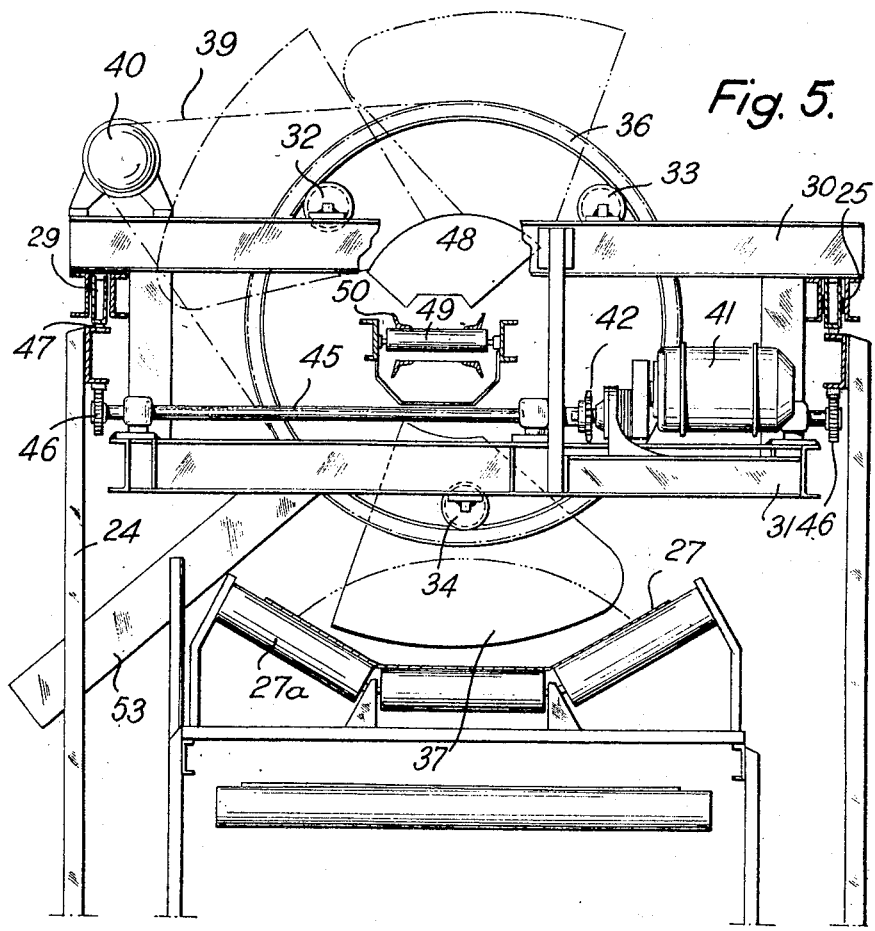
FIG. 5 is a side elevation view of the sampler of FIG. 4.
Figure 6:
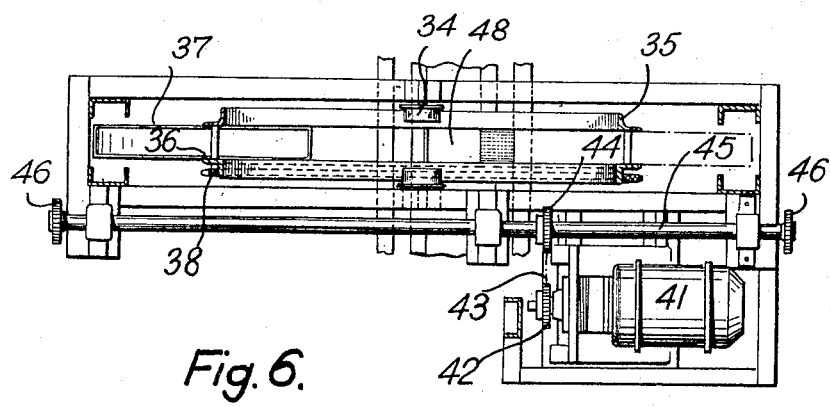
FIG. 6 is a plan view of the sampler of FIG. 4.

Referring next to the embodiment shown in FIGS. 4 to 6, there is shown thereon a supporting structure consisting of uprights 24, side members 25 and cross-members 26, and said supporting structure straddles the main conveyor belt 27 which is supported by rolls 27a to form a trough shape. Mounted on the side members 25, which serve as tracks, is a crab 28 fitted with wheels 29 and upon which is fixed a stand comprising mutually spaced upper cross-members 30 and lower cross-members 31 set at right angles to the longitudinal axis of the main conveyor belt. Mounted upon said cross-members, at the corners of the triangle, are three pairs of aligned railwheels 32, 33 and 34. These wheels are flanged and support a scooping-wheel consisting of two circular members 35, 36, of angle cross-section which are interconnected through adjustable spacing struts and which support a sampling scoop 37. One of these circular members has formed thereon sprocket wheel teeth 38 whereby to enable said scooping-wheel to be driven through a chain 39 by an independent motor 40 mounted on the crab.

The crab is driven through a motor/reduction gear unit 41 whose shaft supports a sprocket wheel 42 drivingly connected through a chain 43 to a sprocket wheel 44 supported on an intermediate shaft 45 to the ends of which are fixed pinions 46 which drive a rack 47 disposed beneath each side-member 25.

Inside the scooping-wheel is disposed a small hopper 48 into which the material sampled by the scoop 37 is spilled. This hopper in turn discharges its contents onto a discharge belt 49 fitted with lateral flanges 50 and supported on upper rollers and lower rollers. This discharge belt passes through the scooping-wheel and is driven by a power drum 51 at one end and runs over an idler drum 52 at the other end. The material collected by the discharge belt 48 is spilled by the latter into a chute 53 which extends to a point outside the compass of the main belt.

Figure 10:
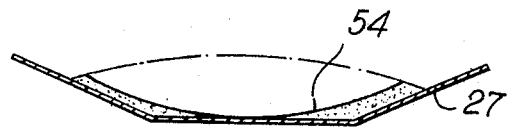
FIGS. 10 and 11 illustrate the traces left respectively at right angles to and parallel with the longitudinal axis of the belt conveyor by the sampling scoop of the sampler of FIGS. 4 to 6.
Figure 11:
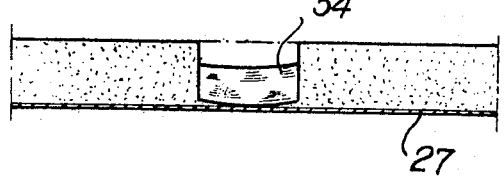

The motor 41, the sprocket wheels 42, 44, the pinions 45, 46 and the racks 47 are devised in such manner that the crab moves in the same direction and at the same speed as the main conveyor belt during the sampling period. Thus the scoop 37 which is fixed to the scooping-wheel and dredges the sample in a direction perpendicular to the longitudinal axis of the main conveyor belt, keeps abreast of the main conveyor belt during the sampling process and leaves thereon a culvert-shaped trace 54 (see FIGS. 10 and 11), of rectangular cross-section, crosswise of the main belt 27 and covering the entire width thereof. The main belt 27 is kept moving during the sampling process. The diameter of the scooping-wheel is adapted to match the profile of the main conveyor belt.

In the forms of embodiment illustrated and described hereinabove, the flanged railwheels mounted at the corners of a triangle by means of apertures enable any wear on the scooping-wheel to be compensated without difficulty. The sampling scoops 12 and 37 and the small hoppers 16 and 48 are made of stainless steel or any other suitable solid or lined material that will assist complete emptying. The two samplers referred to may be associated with a set of interchangeable scoops readily adaptable to the corresponding scooping-wheel by removing and refitting the spacing struts.

The motion of the scooping-wheel is such that the scoop thereon describes a complete revolution in each sampling cycle. The scooping-wheel is caused to rotate either by an adjustable timer or by the closure of contacts inserted into an overall servo-control circuitry. The samples are thereby taken at regular intervals or at a specified moment within a more complex sequence of operations. The scooping-wheel and, with it the scoop, is halted, subsequent to the sampling operation, by a switch actuated by a peg (not shown) fixed to the scooping-wheel.

In both forms of embodiment, the discharge belt 17, 49 conveys the sample beyond the compass of the main conveyor belt. This discharge belt may be kept moving continuously, or may have an operating cycle adapted to that of the scooping wheel.

Tests conducted in order to compare the ash content in samples taken by an automatic sampler of the type hereinbefore described and by manual samplings in the usual way, have shown that the automatic sampler gives results which, from the statistical viewpoint, do not differ from those obtained with the customary method. These tests have also shown that any accumulation of fine particles on the discharge belt, the hopper and the walls and bottom of the scoop, results in but relatively small quantities of fines which play only a very insignificant part in the samplings.

The automatic sampler as described with reference to FIGS. 1 to 3 is particularly well suited for grain sizes not exceeding 35 mm., while that of FIGS. 4 to 6 can be used for grain sizes above 50 mm. and for samples intended for grain size analyses.

The subject automatic sampler of this invention fully meets the requirements as previously set forth herein and enumerated below:

(1) Sampling is effected while the plant is operating.

(2) The sample is as representative as possible of the product to be sampled, being taken without breakage, glancing off, spilling over, or modification of the physical properties of the product.

(3) Recovery and transport of the sample are easily effected.

(4) The sampler can be manually or automatically remote-controlled.

(5) The sampler enables samples of different sizes to be taken.

What I claim is:

1. An automatic scooping-wheel type sampler for sampling a material from a main travelling conveyor belt comprising, in combination, a supporting structure which straddles the main conveyor belt, a rotary scooping-wheel, means for supporting said scooping-wheel on said supporting structure, an independent motor carried by said structure, a transmission interconnecting said motor and said rotary scooping-wheel, a scoop fixed on said scooping-wheel and projecting outwardly with respect to said scooping-wheel for sampling the material from the main travelling conveyor belt, a fixed hopper carried by said supporting structure and into which the material sampled by said scoop is spilled, means for discharging the spilled material from said hopper outside the compass of the main conveyor belt, and means for causing said scooping-wheel to effect a complete revolution at each sampling cycle, said scooping-wheel and the means for supporting said wheel comprising two spaced circular members, adjustable spacing struts interconnecting said circular members, adjustable bearings carried by the supporting structure, and flanged railwheels mounted on said bearings and engaging said circular members, the scoop and the hopper being respectively fixed and disposed between said circular members.

2. A sampler according to claim 1, wherein the flanged railwheels are mounted in pairs at the corners of a triangle whereby to permit ready compensation for wear.

3. A sampler according to claim 1, comprising means detachably connecting the spacing struts with the circular members to enable a plurality of interchangeable scoops to be readily adaptable to said scooping-wheel by disassembling and reassembling the adjustable spacing struts.

4. A sampler according to claim 1, wherein the means for discharging the spilled material from the hopper outside the main conveyor belt compass comprises a discharge belt passing through the scooping-wheel and ending outside the compass of the main conveyor belt, and means for driving said discharge belt.

5. An automatic scooping-wheel type sampler for sampling a material from a main travelling conveyor belt comprising, in combination, a supporting structure which straddles the main conveyor belt, a rotary scooping-wheel fixedly mounted on said structure with its axis perpendicular to the longitudinal axis of the main conveyor belt and consisting of two spaced circular members, adjustable spacing struts interconnecting said circular members, adjustable bearings mounted on said structure, flanged railwheels mounted on said bearings and supporting said circular members, a motor carried by said structure, a transmission interconnecting said motor and said scooping-wheel, a scoop fixed between said circular section members and projecting outwardly with respect to said scooping-whel at a distance from the axis thereof substantially less than that existing between said axis and the main conveyor belt for sampling the material from the main travelling conveyor belt, a fixed hopper disposed between said circular section members and having an open top into which the material sampled by said scoop is spilled, a discharge belt carried by said structure, passing through said scooping-wheel beneath said hopper with its axis perpendicular to that of the main conveyor belt and discharging the material fed from said hopper outside the compass of said main conveyor belt, and means for driving said discharge belt.

6. A sampler according to claim 5, wherein the flanged railwheels are mounted in pairs at the corners of a triangle whereby to permit ready compensation for wear.

7. A sampler according to claim 5, wherein the rotation speed of the scooping-wheel is so determined that the difference between the tangential velocity of the scoop and the speed of the main conveyor belt is as small as possible.

8. An automatic scooping-wheel type sampler for sampling a material from a main travelling conveyor belt which is held to a trough shape comprising, in combination, a supporting structure which straddles the main conveyor belt, tracks disposed on said structure parallel with the axis of the main conveyor belt, a crab adapted to travel along said tracks, means for driving said crab, a rotary scooping-wheel mounted on said crab with its axis parallel to the longitudinal axis of the main conveyor belt and consisting of two spaced circular members, adjustable spacing struts interconnecting said circular members, adjustable bearings mounted on said structure, flanged railwheels mounted on said bearings and supporting said circular members, a motor carried by said crab, a transmission interconnecting said motor and said scooping-wheel, a scoop fixed between said circular members and projecting outwardly with respect to said scooping-wheel at a distance from the axis thereof substantially less than that existing between said axis and the main conveyor belt for sampling the material from the main travelling conveyor belt, a fixed hopper disposed between said circular members and having an open top into which the material sampled by said scoop is spilled, a discharge belt carried by said structure, passing through said scooping-wheel beneath said hopper with its axis parallel to that of the main conveyor belt, means for driving said discharge belt, and a chute receiving the material spilled by the discharge belt, supported by said structure and extending to a point outside the compass of the main conveyor belt.

9. A sampler according to claim 8, wherein the flanged railwheels are mounted in pairs at the corners of a triangle whereby to permit ready compensation for wear.

10. A sampler according to claim 8, wherein the diameter of said scooping wheel and the shape of said scoop match the trough-shaped profile of said main conveyor belt.

11. A sampler according to claim 8, wherein said crab moves in the same direction and at the same speed as said main conveyor belt during the sampling process.

12. A sampler according to claim 8, wherein the means for driving the crab comprises pinions mounted on said crab, a motor supported by said crab and driving said pinions, and racks mounted on the supporting structure and meshing with said pinions.

References Cited by the Examiner

UNITED STATES PATENTS

| | | | |
|---|---|---|---|
| 1,899,126 | 2/1933 | Woodside | 73—421 |
| 2,664,751 | 1/1954 | Johnson | 73—424 X |
| 2,889,709 | 6/1959 | Blyth | 73—423 |
| 3,181,369 | 5/1965 | Taylor | 73—421 |

FOREIGN PATENTS 903,119   8/1962   Great Britain.

OTHER REFERENCES

Republic Enduro Stainless Steels, a publication of Republic Steel Corp., Alloy Steel Div., Massillon, Ohio, 1951, page 349 relied upon.

LOUIS R. PRINCE, *Primary Examiner.*

S. CLEMENT SWISHER, *Assistant Examiner.*